United States Patent
Ikeya et al.

(10) Patent No.: US 12,006,165 B2
(45) Date of Patent: Jun. 11, 2024

(54) SUCTION GRIPPING DEVICE, TRANSFER SYSTEM, AND TRANSFER METHOD

(71) Applicant: KABUSHIKI KAISHA TOSHIBA, Tokyo (JP)

(72) Inventors: Yukihiro Ikeya, Yokohama (JP); Takeshi Toyoshima, Yokohama (JP); Taketo Shiba, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 907 days.

(21) Appl. No.: 17/019,847

(22) Filed: Sep. 14, 2020

(65) Prior Publication Data

US 2021/0094766 A1 Apr. 1, 2021

(30) Foreign Application Priority Data

Sep. 26, 2019 (JP) .................................. 2019-174924

(51) Int. Cl.
*B65G 47/91* (2006.01)
*B25J 15/06* (2006.01)

(52) U.S. Cl.
CPC .......... *B65G 47/912* (2013.01); *B25J 15/065* (2013.01); *B65G 47/917* (2013.01)

(58) Field of Classification Search
CPC .................................................. B65G 47/912
See application file for complete search history.

(56) References Cited

U.S. PATENT DOCUMENTS

| | | | |
|---|---|---|---|
| 4,129,328 A | 12/1978 | Littell | |
| 4,370,092 A * | 1/1983 | Healy | B65G 47/912 |
| | | | 414/797 |
| 7,100,955 B2 * | 9/2006 | Nakamura | B62D 65/02 |
| | | | 294/188 |
| 9,205,558 B1 * | 12/2015 | Zevenbergen | B25J 15/0052 |
| 9,982,691 B2 * | 5/2018 | Girtman | F15B 15/1466 |
| 10,369,706 B2 * | 8/2019 | Petrovski | B25J 15/0616 |
| 10,611,580 B1 * | 4/2020 | Polido | B65G 47/912 |
| 2004/0041422 A1 | 3/2004 | Nakamura | |
| 2017/0106534 A1 | 4/2017 | Nakamoto et al. | |
| 2019/0030729 A1 | 1/2019 | Nagata et al. | |

(Continued)

FOREIGN PATENT DOCUMENTS

| | | |
|---|---|---|
| JP | 5-24289 U | 3/1993 |
| JP | 4106450 B2 | 6/2008 |
| JP | 2010-58213 A | 3/2010 |

(Continued)

*Primary Examiner* — Jonathan Snelting
(74) *Attorney, Agent, or Firm* — Oblon, McClelland, Maier & Neustadt, L.L.P.

(57) ABSTRACT

According to one embodiment, a suction gripping device includes a pad mechanism mounted to a base. The pad mechanism includes a sliding part and a first guide. The sliding part includes a suction pad and a pipe and is slidable in a first direction with respect to the base. The suction pad attaches to a workpiece and is connected to the pipe at one end of the pipe. The first guide guides a sliding direction of the pipe to be in the first direction. The first guide is fixed with respect to the base. An attachment surface of the suction pad contacts a first surface of a workpiece and is tiltable due to a weight of the sliding part when gripping the workpiece. The first surface crosses a sliding direction of the sliding part.

20 Claims, 14 Drawing Sheets

(56) References Cited

U.S. PATENT DOCUMENTS

2019/0047158 A1    2/2019   Petrovski

FOREIGN PATENT DOCUMENTS

| JP | 2011-45946 A | 3/2011 |
| JP | 4889122 B2 | 3/2012 |
| JP | 2017-52052 A | 3/2017 |
| JP | 2019-25644 A | 2/2019 |
| JP | 6496535 B2 | 4/2019 |

* cited by examiner

SUCTION GRIPPING DEVICE, TRANSFER SYSTEM, AND TRANSFER METHOD

CROSS-REFERENCE TO RELATED APPLICATIONS

This application is based upon and claims the benefit of priority from Japanese Patent Application No. 2019-174924, filed on Sep. 26, 2019; the entire contents of which are incorporated herein by reference.

FIELD

Embodiments described herein relate generally to a suction gripping device, a transfer system, and a transfer method.

BACKGROUND

There is a device that grips a workpiece by vacuum-attaching. Technology that can grip the workpiece more stably is desirable for such a device.

DETAILED DESCRIPTION

Figure 1:
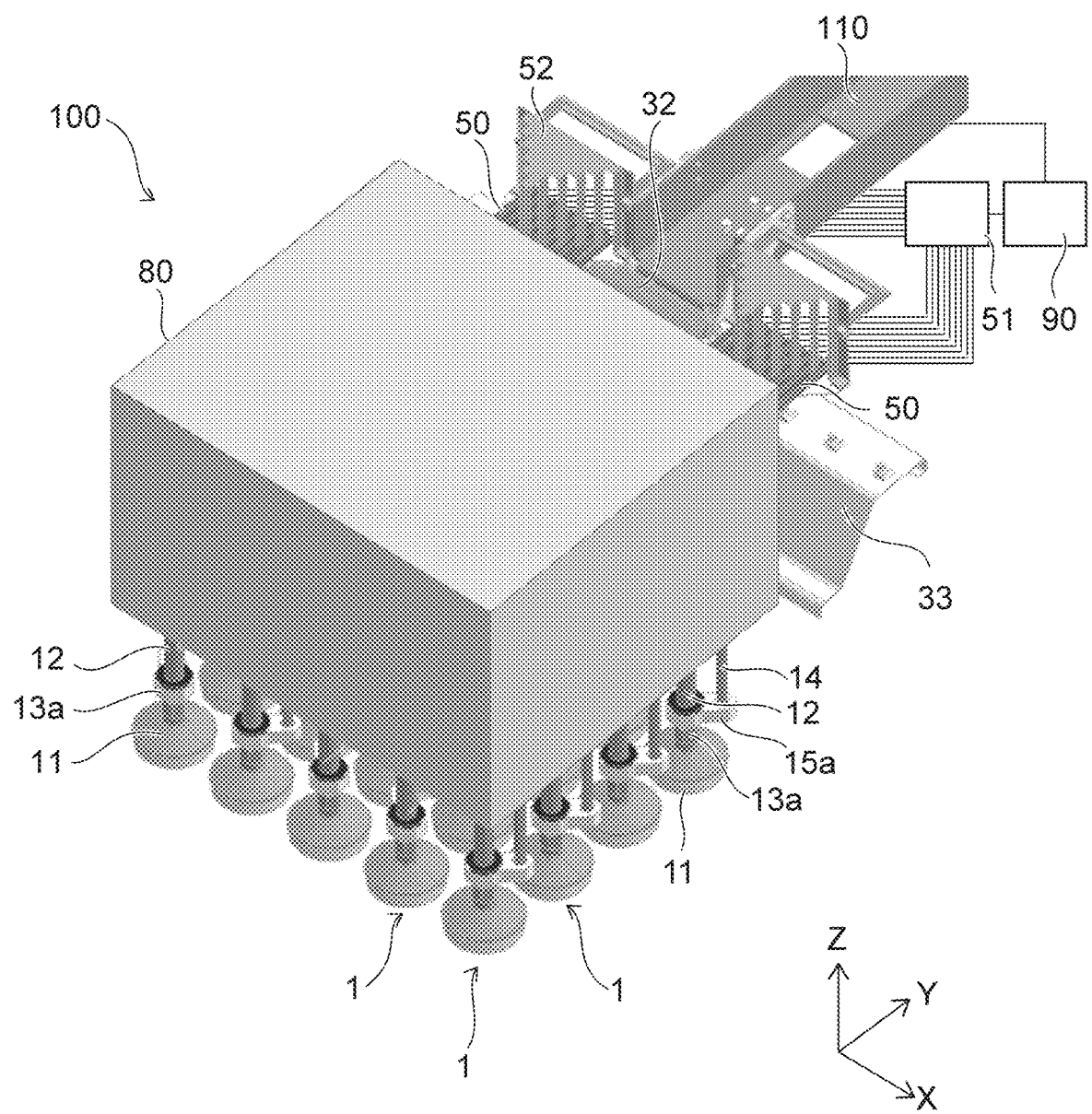
FIG. 1 is a perspective view illustrating a suction gripping device according to an embodiment.

According to one embodiment, a suction gripping device includes a pad mechanism mounted to a base. The pad mechanism includes a sliding part and a first guide. The sliding part includes a suction pad and a pipe and is slidable in a first direction with respect to the base. The suction pad attaches to a workpiece and is connected to the pipe at one end of the pipe. The first guide guides a sliding direction of the pipe to be in the first direction. The first guide is fixed with respect to the base. An attachment surface of the suction pad contacts a first surface of a workpiece and is tiltable due to a weight of the sliding part when gripping the workpiece. The first surface crosses a sliding direction of the sliding part.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 2:
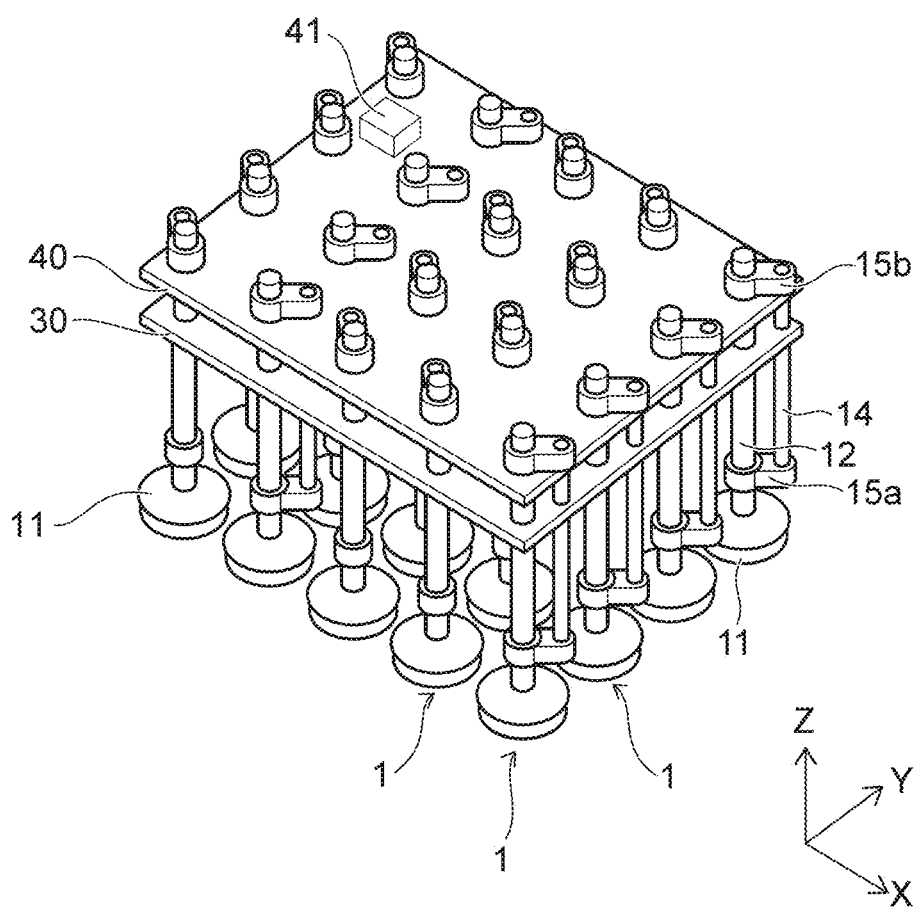
FIG. 2 is a perspective view illustrating the suction gripping device according to the embodiment.

FIG. 1 and FIG. 2 are perspective views illustrating a suction gripping device according to an embodiment.

Figure 3:
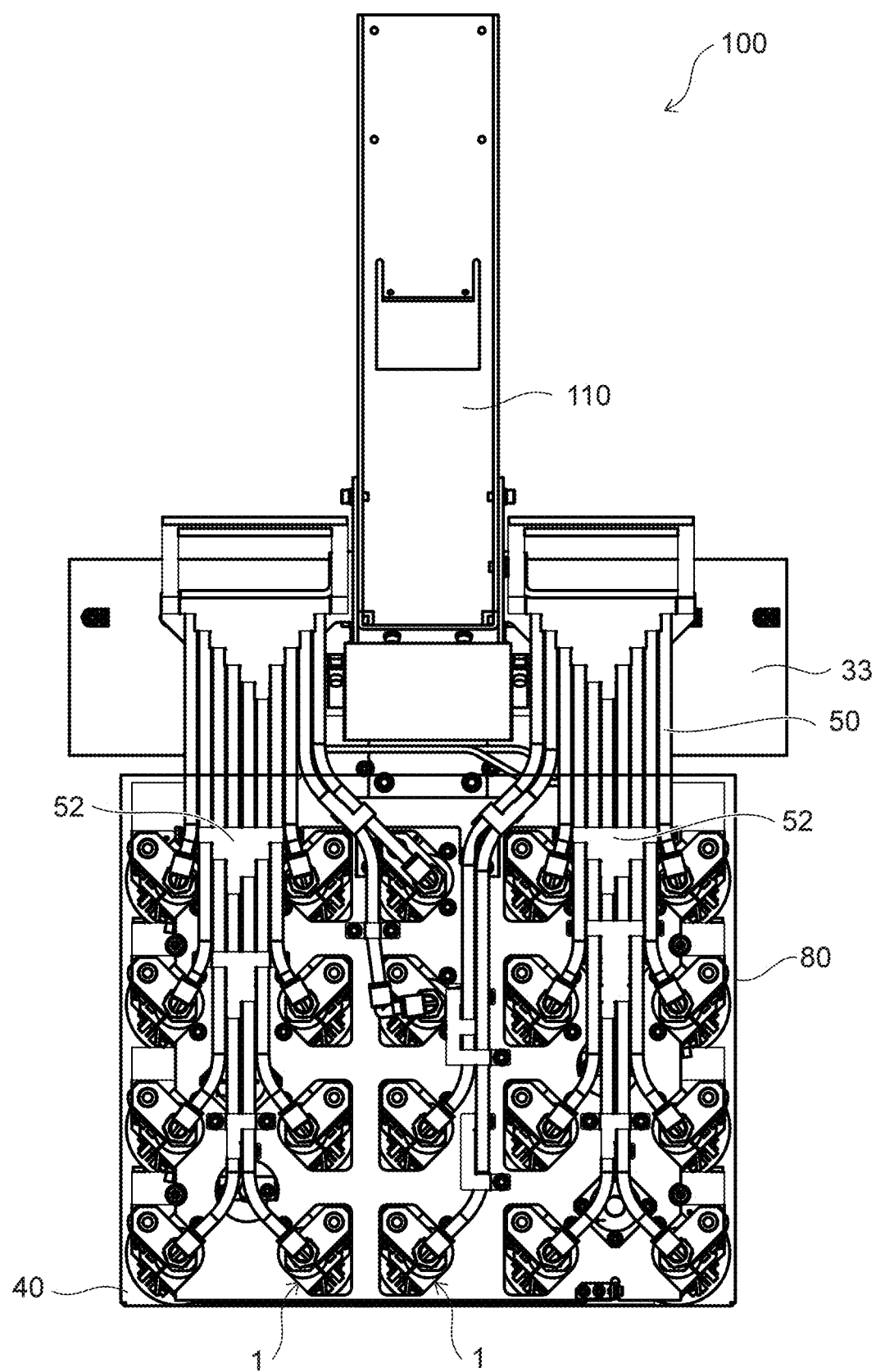
FIG. 3 is a plan view illustrating the suction gripping device according to the embodiment.

FIG. 3 is a plan view illustrating the suction gripping device according to the embodiment.

Figure 4:
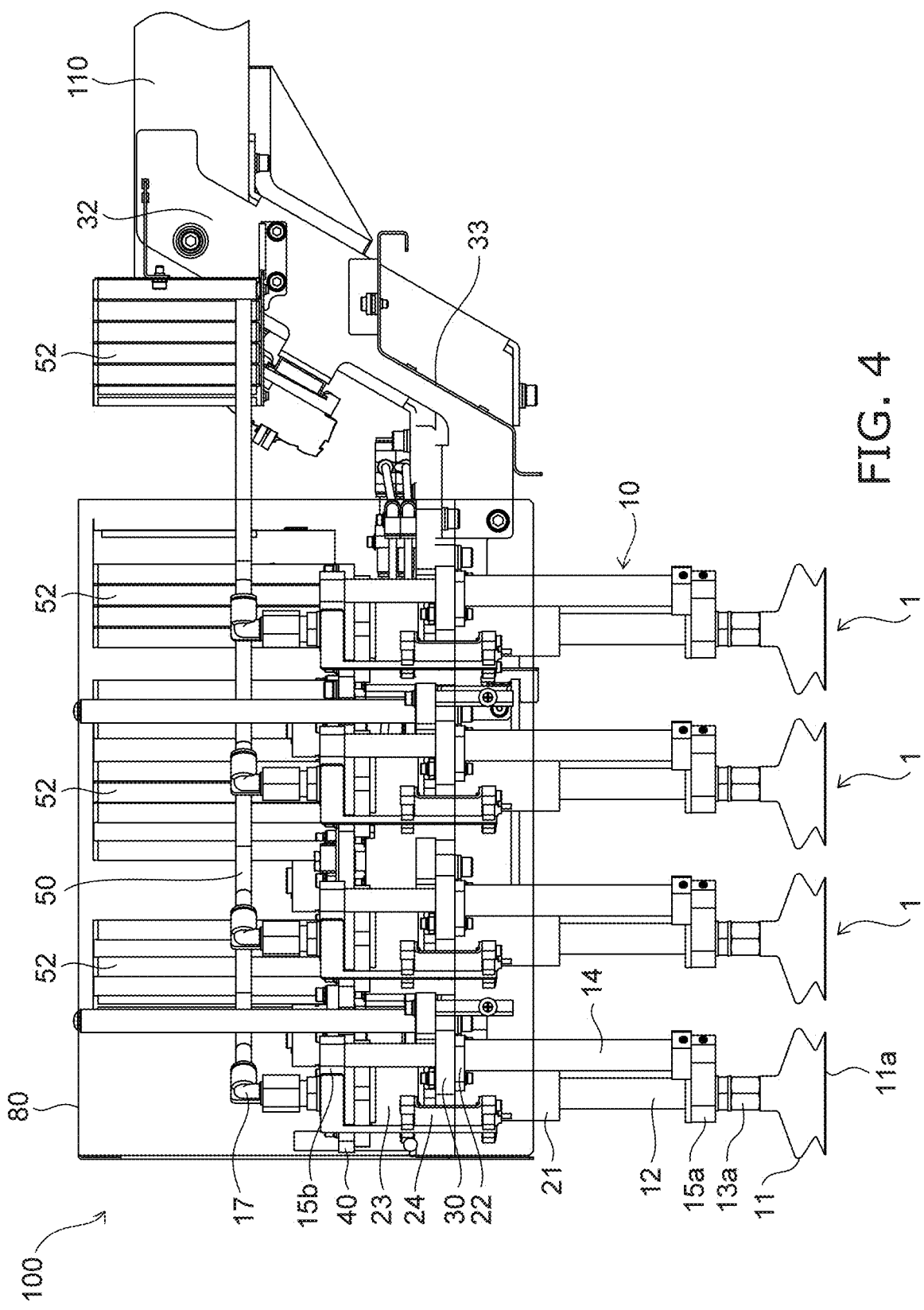
FIG. 4 is a side view illustrating the suction gripping device according to the embodiment.

FIG. 4 is a side view illustrating the suction gripping device according to the embodiment.

Some of the components of the suction gripping device are not illustrated in FIG. 2 to FIG. 4.

As illustrated in FIG. 1 to FIG. 4, the suction gripping device 100 according to the embodiment includes a pad mechanism 1, a base 30, a lock controller 40, a lock control driver 41, a tube 50, a pressure regulator 51, a tube guide 52, a wiring junction block 33, a housing 80, and a controller 90. The suction gripping device 100 includes one or multiple pad mechanisms 1. For example, the pad mechanisms 1 are arranged in at least one direction. The pad mechanisms 1 may be arranged in two directions crossing each other. The arrangement direction of the pad mechanisms 1 crosses the vertical direction. In the example illustrated in FIG. 1, the pad mechanisms 1 are arranged in two mutually-orthogonal horizontal directions. The number, the sizes, and the arrangement directions of the pad mechanisms 1 are modifiable as appropriate according to the configuration and the size of the workpiece.

Here, the arrangement directions of the pad mechanisms 1 are taken as an X-direction (a second direction) and a Y-direction (a third direction). For example, the X-direction and the Y-direction are parallel to the horizontal direction. A direction that crosses the X-Y plane including the X-direction and the Y-direction is taken as a Z-direction (a first direction). For example, the Z-direction is parallel to the vertical direction. In the example illustrated in FIG. 1 to FIG. 4, the X-direction, the Y-direction, and the Z-direction are orthogonal to each other.

The multiple pad mechanisms 1 are mounted to the base 30. The base 30 is fixed to a driver 110. The driver 110 is movable in the X-direction, the Y-direction, and the Z-direction by a drive source such as a not-illustrated actuator, etc. The base 30 is driven in the X-direction, the Y-direction, and the Z-direction by the movement of the driver 110. The multiple pad mechanisms 1 move in the X-direction, the Y-direction, and the Z-direction due to the driving of the base 30.

Figure 5:
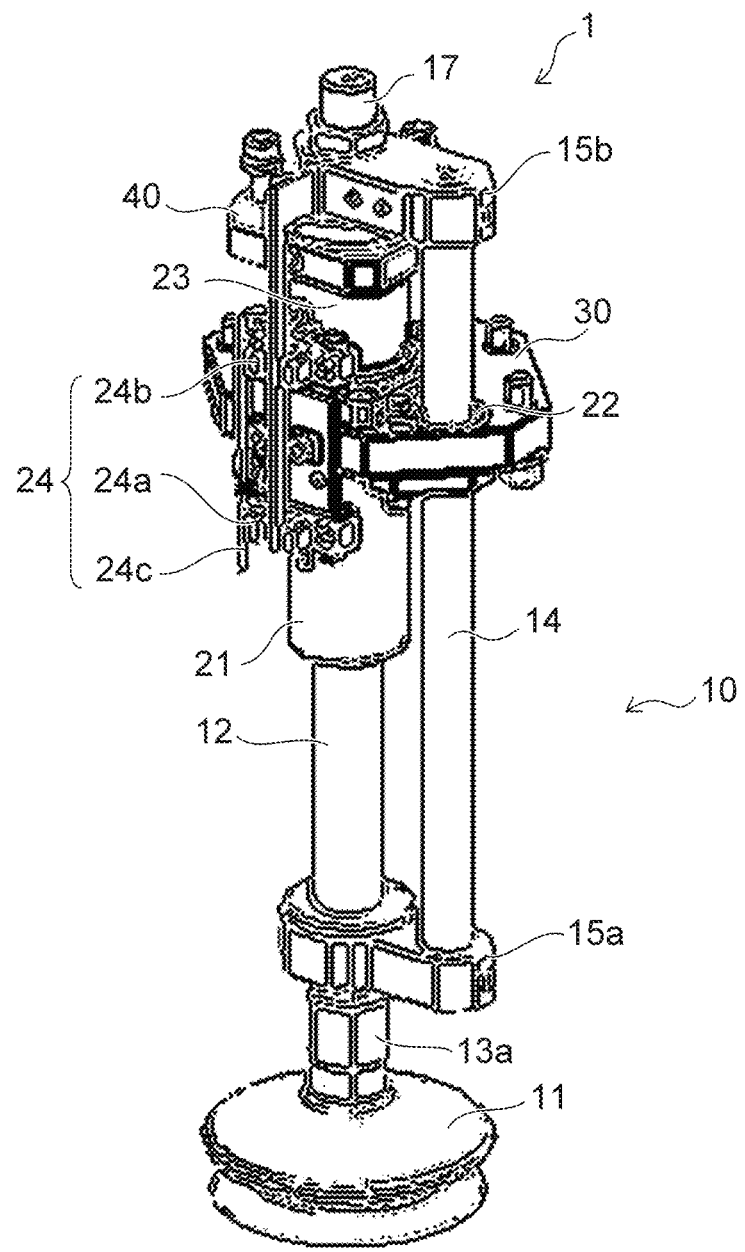
FIG. 5 is a perspective view illustrating a pad mechanism of the suction gripping device according to the embodiment.

FIG. 5 is a perspective view illustrating the pad mechanism of the suction gripping device according to the embodiment.

Figure 6:
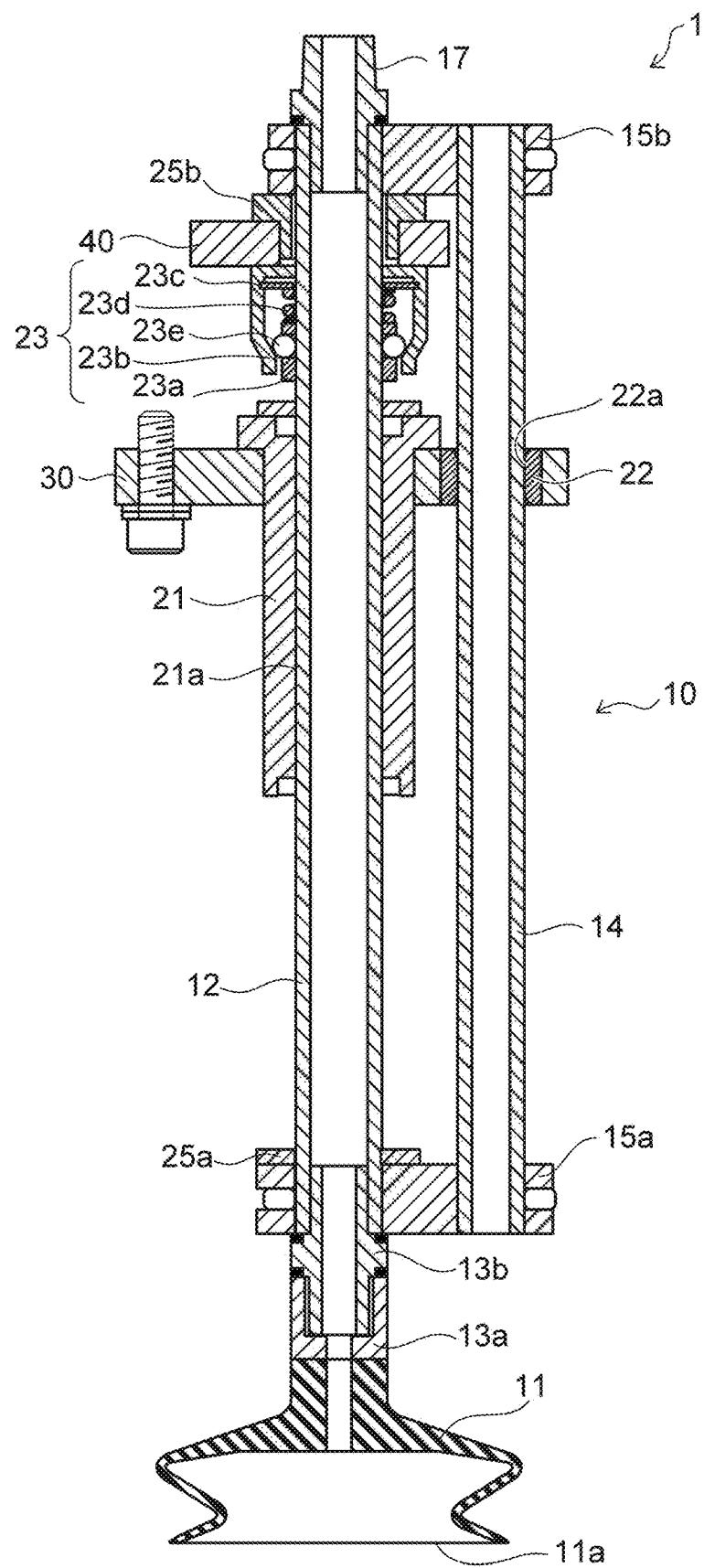
FIG. 6 is a cross-sectional view illustrating the pad mechanism of the suction gripping device according to the embodiment.

FIG. 6 is a cross-sectional view illustrating the pad mechanism of the suction gripping device according to the embodiment.

As illustrated in FIG. 5 and FIG. 6, the pad mechanisms 1 each include a sliding part 10, a first guide 21, a second guide 22, a lock mechanism 23, a detector 24, a lower stopper part 25a, and an upper stopper part 25b. The sliding part 10 includes a suction pad 11, a pipe 12, a metal fitting 13a, a screw part 13b, a rod member 14, a lower coupler 15a (a first coupler), and an upper coupler 15b (a second coupler).

The suction pad 11 has an attachment surface 11a and is vacuum-attachable to the surface of the workpiece to be gripped. For example, the attachment surface 11a of the suction pad 11 is circular along the X-Y plane in the state in which a force is not applied. The suction pad 11 is connected to one end of the pipe 12. The pipe 12 extends in the Z-direction crossing the attachment surface 11a. To increase the gripping force, the surface area of the attachment surface 11a is greater than the surface area of the connection port of the suction pad 11 for the pipe 12.

The connection port of the suction pad 11 is fixed with respect to the connection port of the pipe 12, and the relative positional relationship between the connection port of the suction pad 11 and the connection port of the pipe 12 substantially does not change. In other words, the suction pad 11 is connected rigidly at the one end of the pipe 12. The suction pad 11 and the pipe 12 are coupled airtightly by the metal fitting 13a and the screw part 13b. The metal fitting 13a and the screw part 13b have high rigidity. Therefore, the relative positional relationship between the connection port of the suction pad 11 and the connection port of the pipe 12 substantially does not change even when the suction pad 11 contacts the workpiece.

The pipe 12 is guided by the first guide 21 to slide along the Z-direction. The first guide 21 is fixed with respect to the base 30. The first guide 21 has a hole 21a passing through along the Z-direction. The pipe 12 is inserted through the hole 21a. Not-illustrated balls, rollers, etc., are provided at the inner surface of the hole 21a so that the pipe 12 can slide smoothly with respect to the first guide 21.

The rod member 14 is fixed to the pipe 12. The rod member 14 extends parallel to the pipe 12. In the example of FIG. 1 and FIG. 2, the lower end and the upper end of the rod member 14 are fixed to the pipe 12 respectively by the lower coupler 15a and the upper coupler 15b. In the example illustrated in FIG. 5 and FIG. 6, a hollow pipe is used as the rod member 14. However, air flows only in the pipe 12 when the workpiece is vacuum-attached to the suction pad 11.

Therefore, the rod member 14 may be a member having a filled interior.

The rod member 14 is guided by the second guide 22 to slide along the Z-direction. The second guide 22 is fixed with respect to the first guide 21 and the base 30 and has a hole 22a passing through along the Z-direction. The rod member 14 is inserted through the hole 22a. Balls, rollers, etc., may be provided at the inner surface of the hole 22a so that the rod member 14 can slide smoothly with respect to the second guide 22. The first guide 21 and the second guide 22 are positioned between the lower coupler 15a and the upper coupler 15b in the Z-direction.

The pipe 12 and the rod member 14 are rigid. Accordingly, the pipe 12 and the rod member 14 substantially do not deform when the suction pad 11 contacts the workpiece, grips the workpiece, etc. The suction pad 11 is elastic and is deformable when pressed toward the workpiece. The attachment surface 11a can tilt with respect to the X-Y plane due to the deformation of the suction pad 11.

The lock mechanism 23 is mounted to the pipe 12. The unlocked state in which the pipe 12 is slidable and the locked state in which the sliding of the pipe 12 is limited can be switched by the lock mechanism 23. The sliding of the entire sliding part 10 is limited by limiting the sliding of the pipe 12.

Figure 7A:
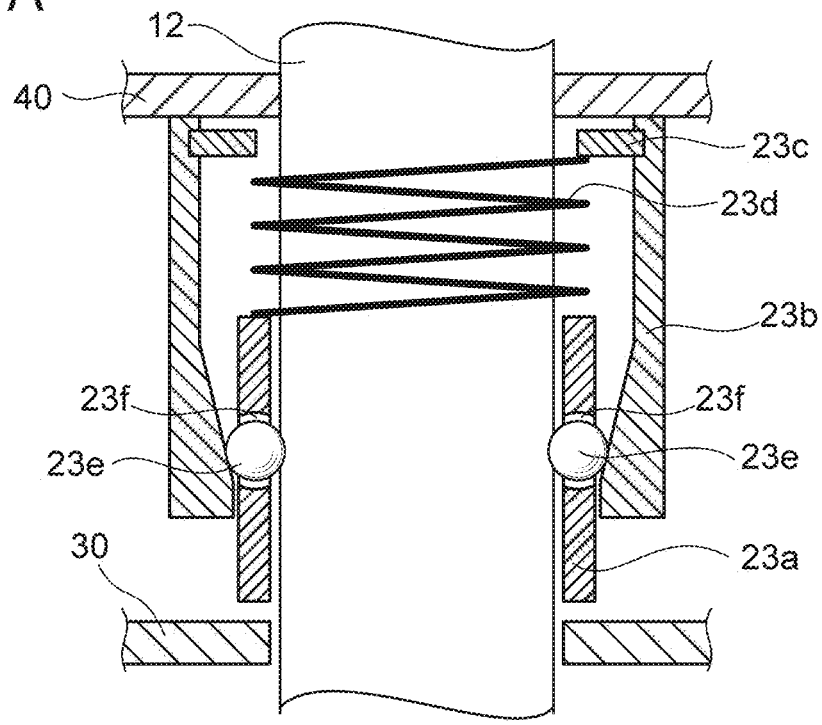
FIG. 7A and FIG. 7B are cross-sectional views illustrating a lock mechanism of the suction gripping device according to the embodiment.
Figure 7B:
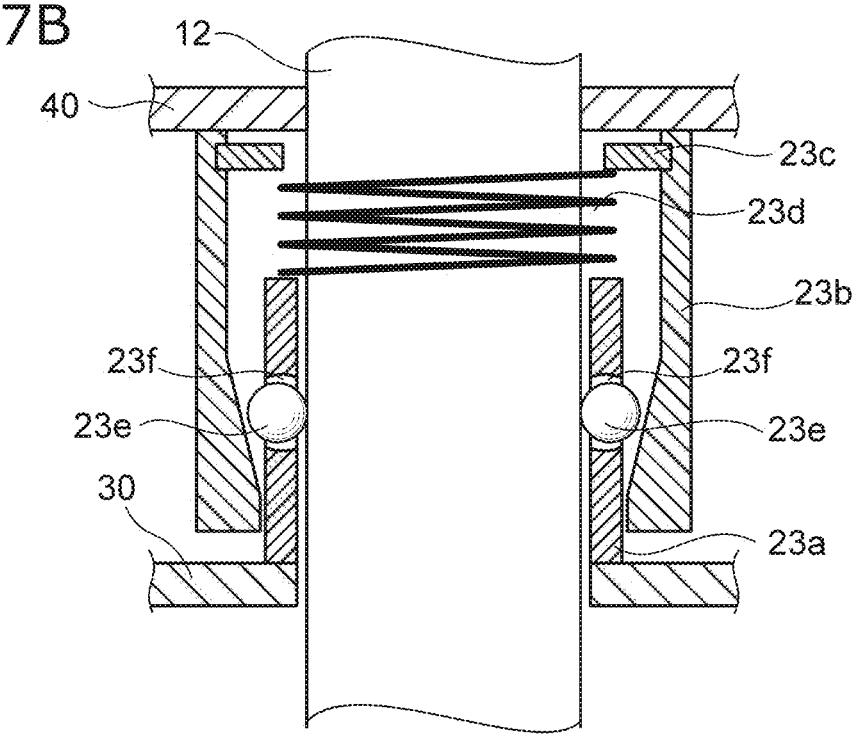

FIG. 7A and FIG. 7B are cross-sectional views illustrating the lock mechanism of the suction gripping device according to the embodiment.

Specifically, as illustrated in FIG. 6, FIG. 7A, and FIG. 7B, the lock mechanism 23 includes an inner perimeter ring 23a, an outer perimeter ring 23b, a spring bearing 23c, an elastic member 23d, and rotating bodies 23e.

The inner perimeter ring 23a is provided around a part of the pipe 12 in the X-direction and the Y-direction. The outer perimeter ring 23b is provided around the inner perimeter ring 23a in the X-direction and the Y-direction. The outer perimeter ring 23b is fixed with respect to the lock controller 40. The inner perimeter ring 23a is movable in the Z-direction with respect to the outer perimeter ring 23b. The inner perimeter ring 23a may be connect to the lock controller 40 via another component and may move following the lock controller 40.

The spring bearing 23c is fixed to the upper end inner perimeter of the outer perimeter ring 23b. The spring bearing 23c opposes the inner perimeter ring 23a in the Z-direction. The elastic member 23d is provided between the inner perimeter ring 23a and the spring bearing 23c. The elastic member 23d is, for example, a coil spring. The elastic member 23d is in a compressive state. Therefore, the elastic member 23d urges the inner perimeter ring 23a in a direction away from the spring bearing 23c.

Multiple gaps 23f are provided along the circumferential direction in the inner perimeter ring 23a. The rotating bodies 23e are provided respectively in gaps 23f. The gaps 23f are provided so that the rotating bodies 23e can move in the X-direction or the Y-direction. The positions in the Z-direction of the rotating bodies 23e change according to the position in the Z-direction of the inner perimeter ring 23a.

A part of the inner surface of the outer perimeter ring 23b is tilted with respect to the Z-direction, and the inner diameter of the part of the outer perimeter ring 23b decreases downward. The rotating bodies 23e are provided at positions opposing the tilted part of the outer perimeter ring 23b inner surface in the X-direction and the Y-direction. The diameters of the rotating bodies 23e are larger than the gap between the pipe 12 and the lower part of the outer perimeter ring 23b. Therefore, when the outer perimeter ring 23b moves upward with respect to the rotating bodies 23e, the tilted part of the outer perimeter ring 23b contacts and catches on the rotating bodies 23e.

The lock controller 40 has multiple holes into which the multiple pipes 12 and the multiple rod members 14 respectively are inserted. The lock control driver 41 drives the lock controller 40 upward or downward with respect to the base 30. When the lock controller 40 is driven, the outer perimeter ring 23b that is fixed to the lock controller 40 also is raised or lowered. For example, the lock controller 40 and the lock control driver 41 move the outer perimeter ring 23b between a first position and a second position lower than the first position.

FIG. 7A illustrates the state when the outer perimeter ring 23b is at the first position. At the first position, the inner perimeter ring 23a does not contact the base 30. The inner perimeter ring 23a is pressed from above by the elastic member 23d. When the position of the inner perimeter ring 23a is lowered, the rotating bodies 23e contact the tilted part of the outer perimeter ring 23b. Thereby, a reaction force toward the pipe 12 is applied from the outer perimeter ring 23b to the rotating bodies 23e, and the rotating bodies 23e are pressed toward the pipe 12. When the rotating bodies 23e are pressed toward the pipe 12, the sliding of the pipe 12 is limited by the frictional resistance between the pipe 12 and the rotating bodies 23e and the frictional resistance between the outer perimeter ring 23b and the rotating bodies 23e. In other words, when the outer perimeter ring 23b is at the first position, the sliding part 10 is in the locked state in which the sliding is limited.

FIG. 7B illustrates the state when the outer perimeter ring 23b is at the second position. When the outer perimeter ring 23b is lowered from the first position and moved toward the second position, the inner perimeter ring 23a also is pressed downward by the elastic member 23d. At this time, the inner perimeter ring 23a contacts the first guide 21 or the base 30. The downward movement of the inner perimeter ring 23a is limited thereby. When the outer perimeter ring 23b is moved to the second position in the state in which the movement of the inner perimeter ring 23a is limited, the reaction force that acts from the outer perimeter ring 23b on the rotating bodies 23e is weakened. Thereby, the frictional resistance that acts on the pipe 12 is weakened, and the pipe 12 becomes slidable. In other words, when the outer perimeter ring 23b is at the second position, the sliding part 10 is in the slidable unlocked state.

In the locked state, the holding force of the lock mechanism 23 regulating the sliding is greater than the sum of the inertial force in the Z-direction and the gravitational forces acting on the mass of the gripped workpiece and the mass of the sliding part 10. For example, the inertial force is generated by accelerating or decelerating when the workpiece is gripped and raised or lowered. Because the holding force of the lock mechanism 23 is sufficiently high, the workpiece can be gripped stably even when the workpiece is gripped and raised or lowered.

For example, the lower stopper part 25a is provided at the upper surface of the lower coupler 15a. In the lock controller 40, the upper stopper parts 25b are provided to correspond to the pipes 12 of the pad mechanisms 1.

When the sliding part 10 is in the unlocked state, the upper coupler 15b contacts the upper stopper part 25b when the sliding part 10 slides downward. Furthermore, sliding of the sliding part 10 downward is limited thereby. The lower stopper part 25a contacts the first guide 21 when the sliding part 10 slides upward. Sliding of the sliding part 10 further upward is limited thereby. In other words, in the suction gripping device 100, the upper coupler 15b and the upper stopper part 25b function as a stopper when the sliding part 10 is lowered. The lower coupler 15a and the lower stopper part 25a function as a stopper when the sliding part 10 is raised.

The lower stopper part 25a and the upper stopper part 25b are elastic to relax the impact when the lower coupler 15a and the upper coupler 15b contact these parts. This is not limited to the illustrated example, and the lower stopper part 25a may be provided at the lower surface of the first guide 21. The upper stopper part 25b may be provided at the lower surface of the upper coupler 15b.

The detector 24 detects the position in the Z-direction of the sliding part 10. For example, the detector 24 includes a lower sensor 24a, an upper sensor 24b, and a sensor dog 24c. The lower sensor 24a and the upper sensor 24b detect whether or not the sensor dog 24c fixed to the pipe 12 exists at the positions of the lower sensor 24a and the upper sensor 24b. In the example illustrated in FIG. 6, one end of the sensor dog 24c is fixed to the pipe 12. The sensor dog 24c is drawn out of the pipe 12 and extends downward.

For example, when the lower sensor 24a and the upper sensor 24b detect the sensor dog 24c, the pipe 12 is at a relatively low position. When the upper sensor 24b detects the sensor dog 24c and the lower sensor 24a does not detect the sensor dog 24c, the pipe 12 is at a relatively high position. For example, an infrared sensor, a distance sensor, a transmission-type photoelectric sensor, etc., can be used as the lower sensor 24a and the upper sensor 24b.

The pipe 12 of each pad mechanism 1 is connected to the tube 50 by a joint 17. The pressure regulator 51 is connected to the tubes 50. The pressure regulator 51 includes a pump, an ejector, a vacuum pump, a pressure regulator valve, a pressure gauge, etc., and regulates the internal pressure of the suction pad 11 via the tube 50 and the pipe 12. For example, the pressure regulator 51 depressurizes the internal pressure of the suction pad 11 from atmospheric pressure. Thereby, the attachment surface 11a is in the state of being attachable to the workpiece. Also, the pressure regulator 51 increases the pressure from the state in which the attachment surface 11a is depressurized and attached to the workpiece. For example, the pressure regulator 51 sets the internal pressure of the suction pad 11 to be the same as atmospheric pressure by venting. The attachment to the workpiece due to the suction pad 11 is released thereby.

For example, the pressure regulator 51 can individually control the internal pressure of each suction pad 11. For example, the suction pad 11 to be depressurized can be selected according to the size and the position of the workpiece.

The base 30 is coupled to the driver 110 via a bracket 32 protruding sideward and upward. Other than the base 30, the housing 80 is fixed to the bracket 32. The upper parts of the pad mechanisms 1, the base 30, the lock controller 40, the tubes 50, etc., are housed inside the housing 80. The multiple tube guides 52 are provided between the base 30 and the housing 80. The tube guide 52 determines the positions of the tubes 50 and aligns the multiple tubes 50.

The wiring junction block 33 also is fixed to the bracket 32. Multiple not-illustrated connectors are provided in the wiring junction block 33. One connector is electrically connected to multiple parts of the same type. Due to the wiring junction block 33, the electrical connections are easy between an external power supply and the components of the suction gripping device 100.

The controller 90 controls the operations of the components of the suction gripping device 100. For example, the controller 90 controls the operations of the lock control driver 41, the pressure regulator 51, etc. The operation of the driver 110 may be controlled by the controller 90 or may be controlled by a controller other than the controller 90.

Figure 8:
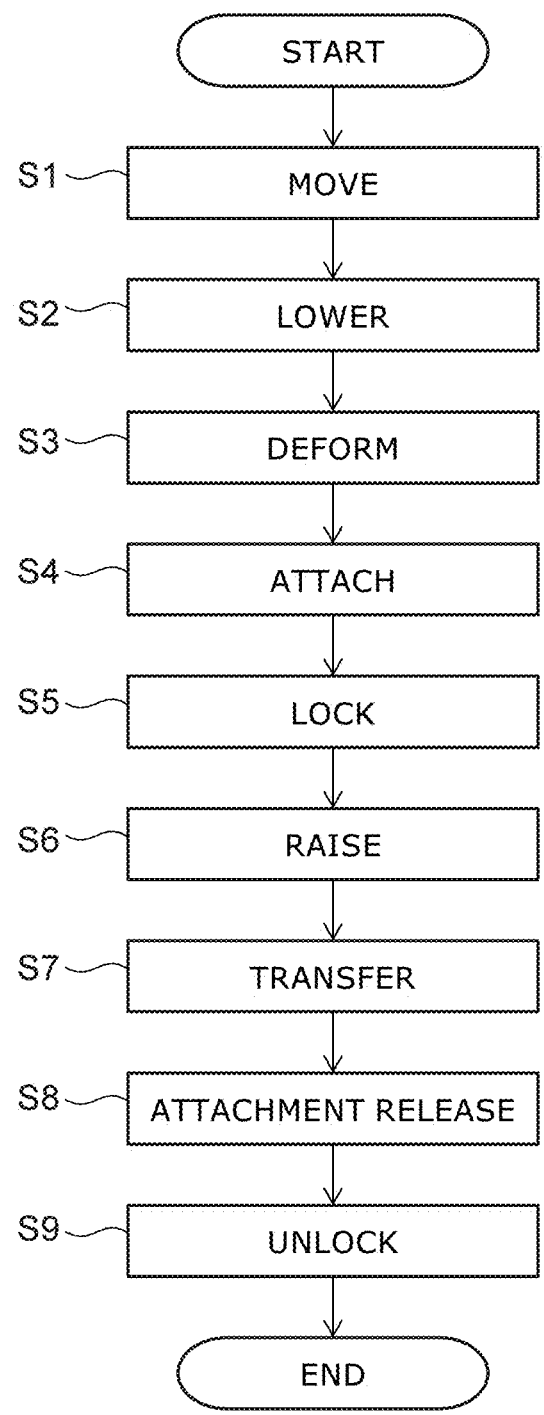
FIG. 8 is a flowchart illustrating an operation of the suction gripping device according to the embodiment.

FIG. 8 is a flowchart illustrating an operation of the suction gripping device according to the embodiment.

FIG. 9A to FIG. 9D and FIG. 10A to FIG. 10C are schematic views illustrating the operation of the suction gripping device according to the embodiment.

In the example illustrated in FIG. 9A to FIG. 9D, a workpiece W3 is stacked on workpieces W1 and W2. The suction gripping device 100 suction-grips the workpiece W3 and transfers the workpiece W3 to a prescribed position.

In the initial state, the suction gripping device 100 does not suction-grip the workpiece. At this time, the sliding part 10 is in the unlocked state. When the sliding part 10 is in the unlocked state, the sliding part 10 slides downward due to the weight of the sliding part 10. Therefore, in the initial state, the sliding part 10 slides downward to the limit for the base 30. Here, the weight means the magnitude of the gravitational force acting on an object.

Figure 9A:
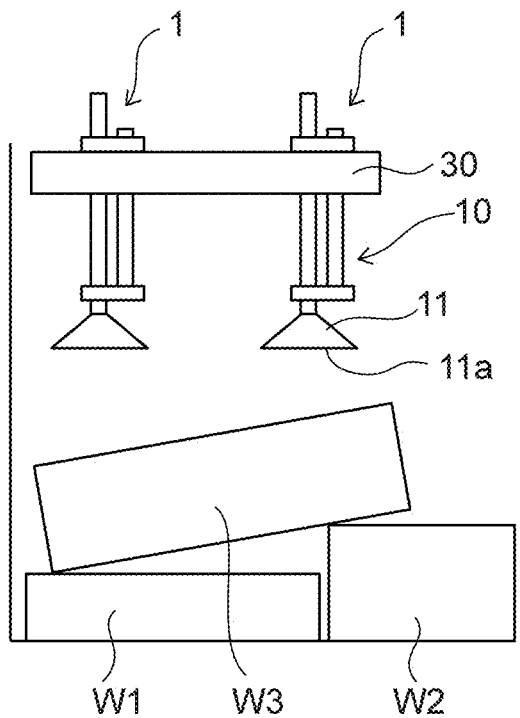
FIG. 9A to FIG. 9D are schematic views illustrating the operation of the suction gripping device according to the embodiment.
Figure 9B:
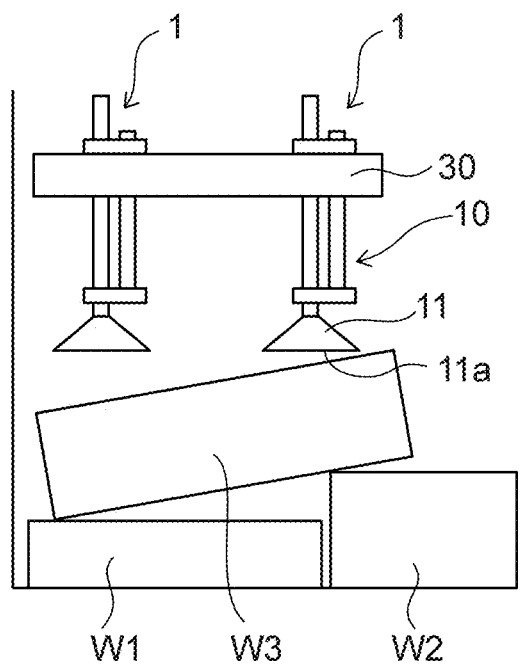
Figure 9C:
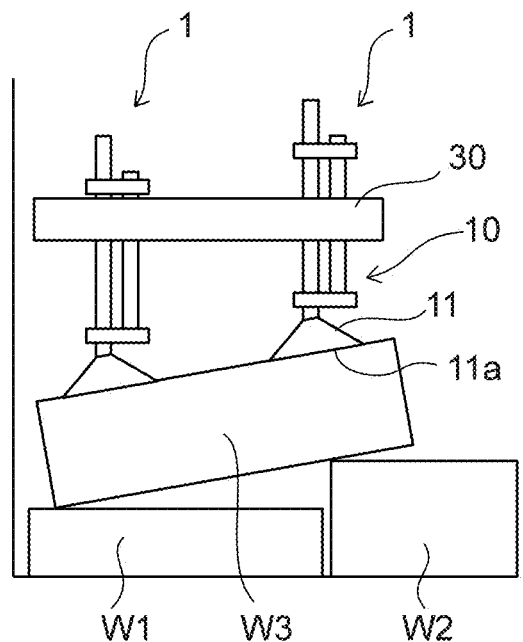

As illustrated in FIG. 9A, the multiple pad mechanisms 1 are moved above the workpiece W3 by driving the base 30 (step S1 of FIG. 8). As illustrated in FIG. 9B, the multiple pad mechanisms 1 are lowered by driving the base 30 (step S2). When the suction pads 11 contact the top surface of the workpiece W3, the suction pads 11 are pressed toward the workpiece W3 by the weight of the sliding part 10. As illustrated in FIG. 9C, the suction pads 11 are deformed by the pressing force caused by the weight of the sliding part 10 so that the attachment surfaces 11a conform to the top surface of the workpiece W3 (step S3).

In step S3, the base 30 is lowered until the suction pads 11 contact the top surface of the workpiece W3. At this time, there are no elastic members or the like provided between the base 30 and the suction pads 11. Also, the sliding part 10 slides sufficiently smoothly with respect to the base 30. Accordingly, the pressing force that corresponds to the weight of the sliding part 10 is applied to each of the suction pads 11 regardless of the sliding amounts of each of the sliding parts 10.

Figure 9D:
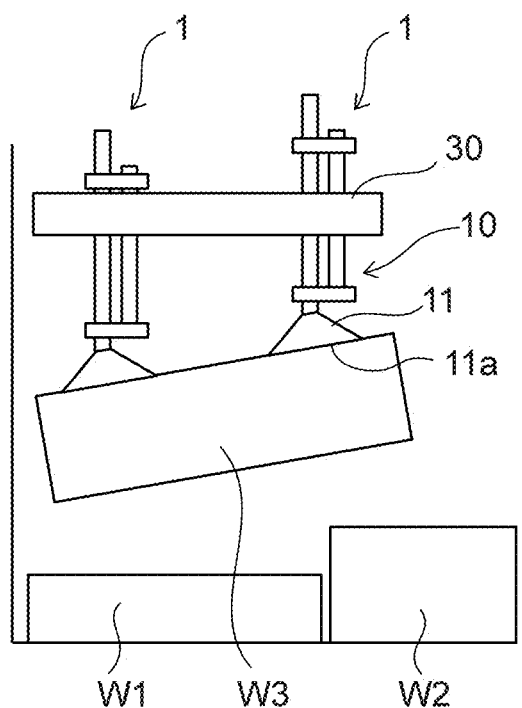

When the suction pads 11 have deformed to contact the top surface of the workpiece W3 and the attachment surfaces 11a conform to the top surface of the workpiece W3, the suction pads 11 are attached to the workpiece W3 by operating the pressure regulator 51 (step S4). The sliding parts 10 are switched to the locked state by the lock mechanism 23 by driving the lock controller 40 (step S5). Thereafter, the sliding of the sliding parts 10 is limited thereby. As illustrated in FIG. 9D, the driver 110 raises the base 30 and the multiple pad mechanisms 1 (step S6).

Figure 10A:
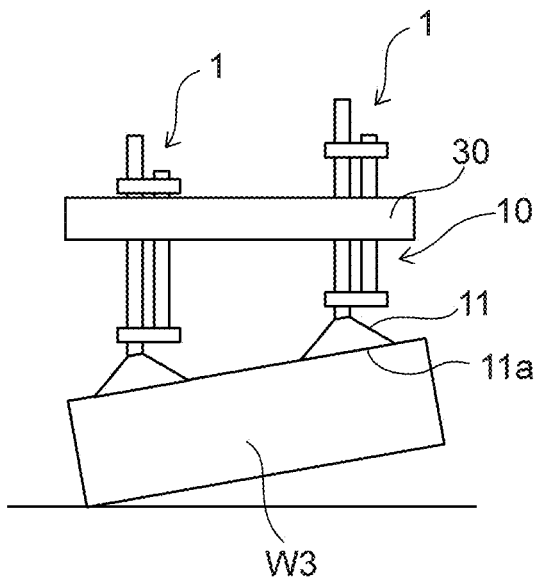
FIG. 10A to FIG. 10C are schematic views illustrating the operation of the suction gripping device according to the embodiment.
Figure 10B:
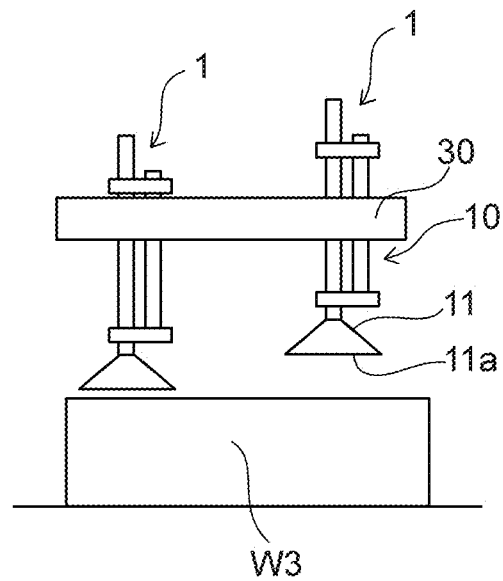
Figure 10C:
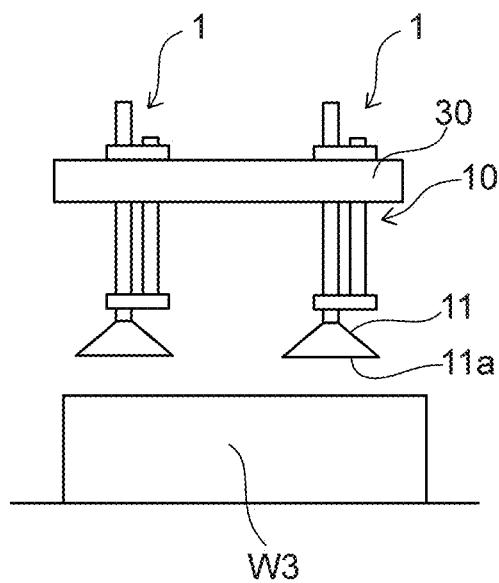

As illustrated in FIG. 10A, the workpiece W3 is transferred to a prescribed position by driving the base 30 (step S7). After transferring the workpiece W3 to the prescribed position, the attachment is released by increasing the internal pressure of the suction pads 11 (step S8). Thereby, as illustrated in FIG. 10B, the workpiece W3 is placed at the prescribed position. The sliding parts 10 are switched to the unlocked state by the lock mechanism 23 by driving the lock controller 40 (step S9). By switching to the unlocked state, the sliding parts 10 slide downward to the limit for the base 30 as illustrated in FIG. 10C due to the weights of the sliding parts 10.

The workpiece can be transferred by the operation described above. In the operation described above, the base 30 is driven by the driver 110. Also, the sequence of steps S8 and S9 is arbitrary. Step S9 may be performed before step S8. Or, steps S8 and S9 may be performed simultaneously.

Effects of the embodiments will now be described with reference to FIG. 11A to FIG. 12.

Figure 11A:
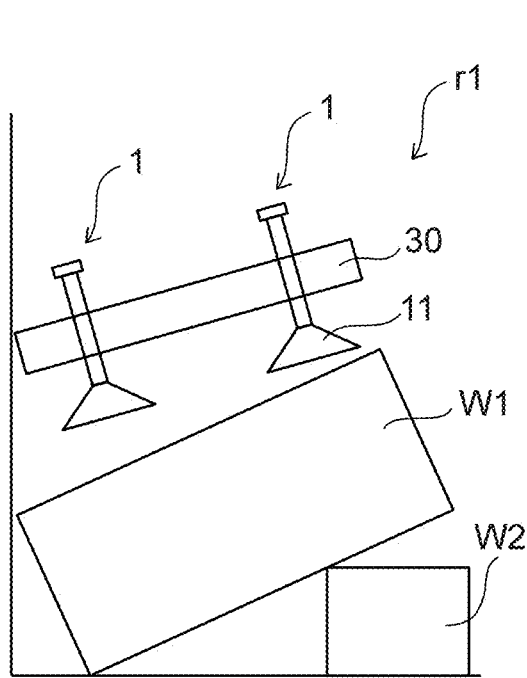
FIG. 11A to FIG. 11C are schematic views illustrating suction gripping devices according to reference examples.
Figure 11B:
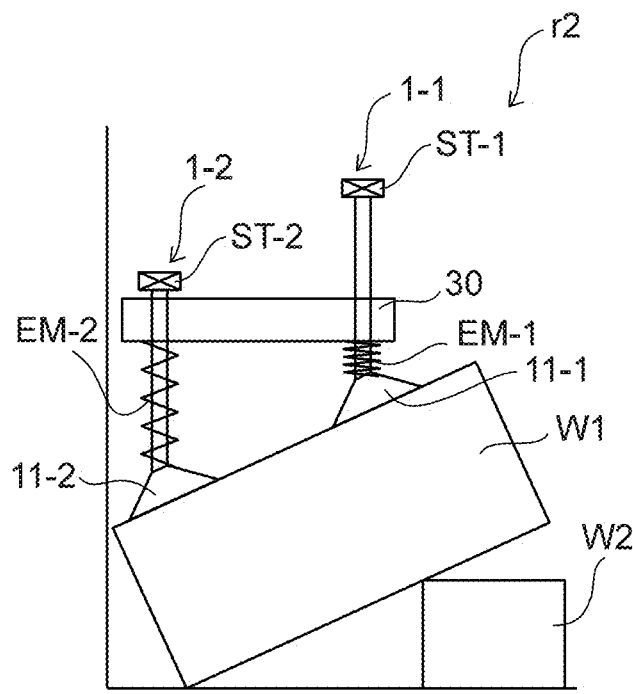
Figure 11C:
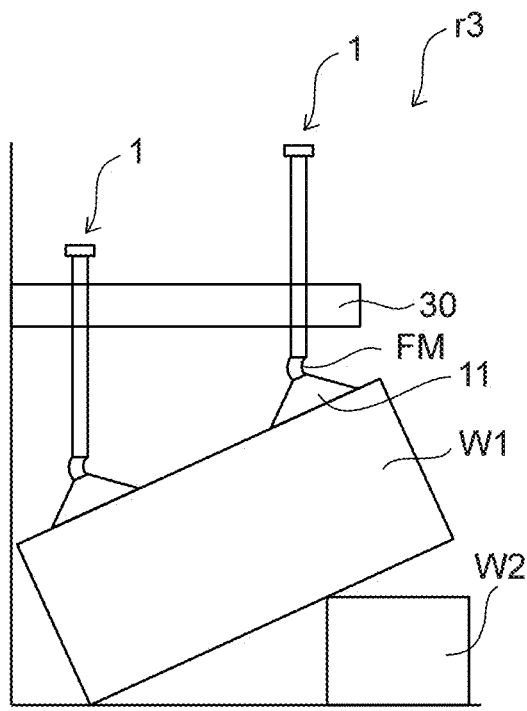

FIG. 11A to FIG. 11C are schematic views illustrating suction gripping devices according to reference examples.

Figure 12:
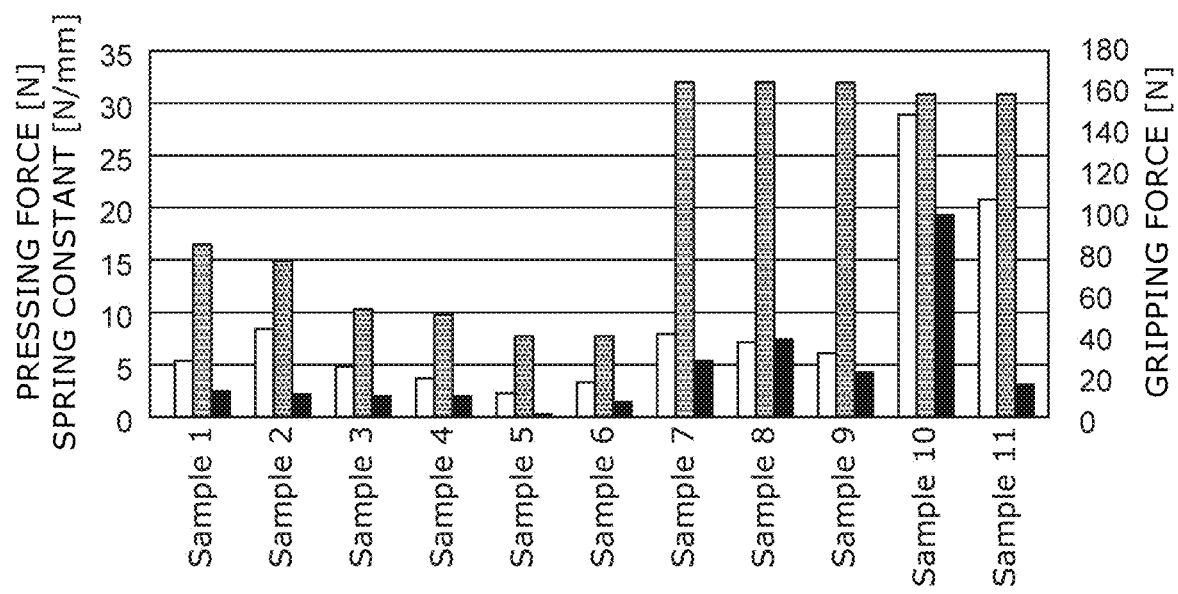
FIG. 12 is a graph illustrating characteristics of suction pads.

FIG. 12 is a graph illustrating characteristics of suction pads.

A suction gripping device r1 illustrated in FIG. 11A is configured so that the tilt of the base 30 with respect to the horizontal plane can be modified. In a suction gripping device r2 illustrated in FIG. 11B, elastic members EM are provided between the base 30 and the suction pads 11. In a suction gripping device r3 illustrated in FIG. 11C, soft members FM are provided between the suction pads 11 and the pipes 12.

In the examples illustrated in FIG. 11A to FIG. 11C, the workpieces W1 and W2 that are to be transferred by the suction gripping device are placed. The workpiece W1 is stacked on the workpiece W2, and the top surface of the workpiece W1 is tilted with respect to the horizontal plane.

According to the suction gripping device r1 illustrated in FIG. 11A, the tilt of the base 30 and the suction pads 11 can be adjusted according to the tilt of the top surface of the workpiece W1. Therefore, the workpiece W1 can be gripped stably even when the top surface of the workpiece W1 is tilted.

However, when the workpiece W1 is placed proximally to an obstacle such as a wall, a fence, or the like as illustrated in FIG. 11A, such an obstacle interferes with the tilt of the base 30. Accordingly, according to the suction gripping device r1, it is difficult to grip the tilted workpiece W1 when the workpiece W1 is placed proximally to the obstacle.

The suction gripping device r2 illustrated in FIG. 11B is moved above the workpiece W1 and lowered vertically toward the workpiece W1. The suction gripping device r2 causes the suction pads 11 to contact the top surface of the workpiece W1. At this time, the elastic members EM are compressed and apply elastic forces on the suction pads 11 toward the workpiece W1. The suction pads 11 are deformed by the elastic forces so that the attachment surfaces of the suction pads 11 conform to the top surface of the workpiece W1. According to the suction gripping device r2, the base 30 is not tilted with respect to the horizontal plane; therefore, the interference between the base 30 and an obstacle such as a wall, a fence, etc., when gripping the tilted workpiece W1 can be avoided.

However, when causing the attachment surfaces to conform to the top surface of the workpiece W1, a large elastic force from an elastic member EM-1 having a large compression amount is applied to the workpiece W1 as illustrated in FIG. 11B. There is a possibility that the workpiece W1 may be deformed or damaged due to the elastic force. Also, when the workpiece W1 is gripped, the distance between the base 30 and a stopper ST-1 of a pad mechanism 1-1 is greater than the distance between the base 30 and a stopper ST-2 of a pad mechanism 1-2. When raising the base 30, the stopper ST-2 contacts the base 30 before the stopper ST-1 contacts the base 30. Therefore, the load of the workpiece W1 is applied concentratively to a suction pad 11-2 until the base 30 contacts the stopper ST-1. Thereby, there is a possibility that the vacuum-attachment to the workpiece W1 may become unattached, and the workpiece W1 can no longer be gripped.

The suction gripping device r3 illustrated in FIG. 11C can switch between the locked state in which the sliding of the pad mechanisms 1 is limited and the unlocked state in which the pad mechanisms 1 are slidable. The suction pads 11 are caused to contact the top surface of the workpiece W1 by lowering the base 30 from above the workpiece W1 in the unlocked state. At this time, the soft members FM are deformed easily by the weights of the sliding parts of the pad mechanisms 1. The positions of the suction pads 11 with respect to the pipes 12 are changed easily by the deformation of the soft members FM. Thereby, the attachment surfaces of the suction pads 11 are tilted with respect to the horizontal plane. By providing the soft members FM, the force that is applied to the workpiece W1 from the pad mechanisms 1 can be reduced.

However, the deformation amount is different between the soft members FM when the tilt or the configuration is nonuniform between parts of the top surface of the workpiece W1. When the workpiece W1 is gripped and the base 30 is raised, the load of the workpiece W1 is applied to each of the suction pads 11 after the deformation of the soft member FM is restored. Therefore, the load of the workpiece W1 is applied concentratively to the suction pads 11 connected to the soft members FM having small deformation amounts until the deformations of the soft members FM having large deformation amounts are restored. Thereby, similarly to the suction gripping device r2, there is a possibility that the vacuum-attachment of the workpiece W1 may become unattached, and the workpiece W1 can no longer be gripped. Also, the soft members FM are soft and easily scratched. If the soft members FM are scratched, there is a possibility that leakage may occur when gripping, and the suction pads 11 can no longer be depressurized sufficiently.

For these problems, in the suction gripping device 100 according to the embodiment, the sliding parts 10 of the pad mechanisms 1 slide downward with respect to the base 30 due to the weights of the sliding parts 10. Also, the suction pads 11 are connected to the pipes 12. In the suction gripping device 100, the positions of the connection ports of the suction pads 11 do not change with respect to the pipes 12 as in the suction gripping device r3. When the suction pads 11 contact the workpiece, the suction pads 11 are deformed by the weights of the sliding parts 10. The suction pads 11 have higher elasticity than the soft members FM and deform less easily than the soft members FM. The sliding parts 10 of the suction gripping device 100 according to the embodiment are heavier than those of the suction gripping device r3 so that the suction pads 11 are deformed by the weights of the sliding parts 10.

The suction pads 11 are deformed by the weights of the sliding parts 10 so that the attachment surfaces 11a conform to the top surface of the workpiece; therefore, the interference of the base 30 with a wall, a fence, etc., as in the suction gripping device r1 can be suppressed. Also, the application of a large force to the workpiece by the elastic force of the elastic member EM as in the suction gripping device r2 can be avoided. The concentration of the load of the workpiece at a portion of the suction pads 11 due to the deformation amount difference between the soft members FM as in the suction gripping device r2 can be suppressed.

In other words, according to the embodiment, even when the top surface of the workpiece is tilted, the workpiece can be suction-gripped more stably while suppressing the interference between an obstacle and the base 30 of the suction gripping device 100 and the excessive pressing of the workpiece by the suction pads 11.

The inventor verified the weight of the sliding part 10 necessary to deform the suction pad 11. The pressing force necessary to cause a tilt of 15 degrees with respect to the horizontal plane for the attachment surface 11a of the suction pad 11 connected rigidly to the pipe 12 was measured for eleven types of suction pads 11 (samples 1 to 11) having mutually-different characteristics. The spring constant from when the attachment surface 11a is tilted 15 degrees with respect to the horizontal plane was measured. The internal pressure of the suction pad 11 was set to −60 kPa in gauge pressure, and the gripping force was measured.

In FIG. 12, the vertical axis at the left side is the pressing force (N) and the spring constant (N/mm). The vertical axis at the right side is the gripping force (N) due to one suction pad 11. The white bars with black outlines illustrate the pressing force. The dotted bars illustrate the gripping force. The solid black bars illustrate the spring constant. The configuration, the material, the diameter, and the like of the attachment surface 11a are different between the suction pads 11 according to the samples 1 to 11. Therefore, the pressing force, the spring constant, and the gripping force also are different between the samples 1 to 11.

In the suction gripping device 100 according to the embodiment, for example, the suction pad 11 includes natural rubber to have a moderate elasticity. By using such a suction pad 11, the change of the configuration, the surface area, etc., of the attachment surface 11a when the suction pad 11 contacts the workpiece W can be reduced, and the workpiece W can be suction-gripped stably. Also, the excessive deformation of the suction pad 11 can be suppressed, and the change amount difference between the suction pads 11 when gripping the workpiece can be reduced. The concentration of the load of the workpiece at a portion of the suction pads 11 when lifting the workpiece can be suppressed thereby.

For example, the pressing force necessary to cause a tilt of 15 degrees is 5.5 N or more for the attachment surface 11a of the suction pad 11 according to the sample 1. Accordingly, when the suction pad 11 according to the sample 1 is used, the workpiece W that has a top surface tilt of 15 degrees or less can be gripped stably if the weight of the sliding part 10 is 560 g or more. Similarly, the pressing force necessary to cause a tilt of 15 degrees for the attachment surface 11a of the suction pad 11 according to the sample 5 is 2.5 N or more. When the suction pad 11 according to the sample 5 is used, the workpiece W that has a top surface tilt of 15 degrees or less can be gripped stably if the weight of the sliding part 10 is 250 g or more. By adjusting the weight of the sliding part 10 so that the pressing force applied to the suction pad 11 by the weight of the sliding part 10 is 2.5 N or more, the attachment surface 11a can be tilted 15 degrees or more for all of the suction pads 11 according to the samples 1 to 11. According to the investigation results of the inventor, it is considered that even a pressing force of less than 1 N is not a problem in the suction gripping device r3 according to the reference example illustrated in FIG. 11C because the soft member FM deforms easily.

For example, as the workpiece W, the suction gripping device 100 transfers articles packaged in a corrugated fiberboard box. According to the verification results of the inventor, in an actual workplace in which corrugated fiberboard boxes containing articles are transferred, the tilt was 10 degrees or less for many of the top surfaces. Accordingly, it is favorable for the weight of the sliding part 10 to be set so that the tilt of the attachment surface 11a can be changed 10 degrees or more by the weight of the sliding part 10.

For example, the change of the tilt of the attachment surface 11a due to the weight of the sliding part 10 can be verified using a member that is rigid. As the member, a corrugated fiberboard box that is assembled so that the top surface is difficult to deform similarly to actual packed goods in which articles are packaged may be used. The member is disposed to be tilted 10 degrees or more, and the sliding part 10 is caused to slide by its weight toward the top surface of the member. It is sufficient for the tilt of the attachment surface 11a to be 10 degrees or more when the suction pad 11 contacts the top surface and is deformed by the weight of the sliding part 10.

In the suction gripping device 100, the weight of the sliding part 10 is increased by providing the rod member 14, the lower coupler 15a, and the upper coupler 15b. However, the suction gripping device 100 may include only one or two of the rod member 14, the lower coupler 15a, or the upper coupler 15b. The rod member 14, the lower coupler 15a, and/or the upper coupler 15b may not be provided in the suction gripping device 100. In such a case, the weight of the sliding part 10 can be increased by adjusting the weights of the pipe 12, the metal fitting 13a, the screw part 13b, etc. For example, the sliding part 10 can be made heavier by selecting the diameter and the material of the pipe 12 and the size and the material of the screw part 13b as appropriate.

The rod member 14 extends parallel to the pipe 12 toward the suction pad 11 from a position proximal to the joint 17 linking the tube 50 and the pipe 12. The rod member 14 extends along the direction in which the sliding part 10 slides. When the suction pad 11 contacts the workpiece, the weight of the rod member 14 is applied to the workpiece along the direction in which the weight of the pipe 12 is applied. When the sliding part 10 slides and the suction pad 11 is attached to the workpiece, the rod member 14 slides with the pipe 12 to approach the workpiece.

If the rod member 14 is fixed with respect to the pipe 12 and is inserted into the second guide 22, the rotation around the Z-direction of the pipe 12 can be limited. For example, when the suction pad 11 is attached to the workpiece W and the pad mechanism 1 is raised, there are cases where a rotational force around the Z-axis is applied to the suction pad 11. At this time, the rotational force urges the rod member 14 to rotate around the pipe 12, but the rotation of the rod member 14 is limited by the second guide 22. Thereby, the workpiece W can be gripped more stably.

Also, it is easy to adjust the weight of the sliding part 10 by increasing the weight of the sliding part 10 by providing one or more of the rod member 14, the lower coupler 15a, or the upper coupler 15b. For example, by setting the weight of the rod member 14 to about 200 g, the optimal suction pad 11 corresponding to the size, the weight, etc., of the workpiece to be transferred can be selected regardless of the weight of the suction pad 11.

For example, it is favorable for a weight Wt1 of the sliding part 10 to be not less than 1.0 times and not more than 1.2 times a weight Wt2 capable of causing a tilt of 15 degrees of the attachment surface 11a when the suction pad 11 contacts a workpiece having a tilted top surface. As described above, the tilt is 10 degrees or less for many top surfaces in an actual workplace. However, there are also cases where the tilt of the top surface incidentally becomes about 15 degrees due to shifting of the workpiece when transferring, impacts to a cart or a pallet on which workpieces are stacked, etc. By setting the weight Wt1 to be not less than 1.0 times the weight Wt2, even a workpiece having a top surface tilt of 15 degrees can be suction-gripped stably. However, if the weight Wt1 is too large, the load that is applied to the workpiece becomes excessively large. There is a possibility that the workpiece may be deformed or damaged thereby. Accordingly, it is favorable for the weight Wt1 to be not more than 1.2 times the weight Wt2.

The mechanism for suppressing the rotation of the pipe 12 is modifiable as appropriate. For example, a projection or a groove may be provided in the pipe 12, and a groove or a projection that engages the projection or the groove of the pipe 12 may be provided in the inner surface of the hole 21a of the first guide 21. The projection or the groove is provided along the Z-direction. By such a mechanism as well, the rotation around the Z-direction of the pipe 12 can be suppressed. However, there is a possibility that a large rotational force may damage the projection if the rotation is suppressed by the engagement of a projection and a groove. It is favorable to provide the rod member 14 and the second guide 22 to stably limit the rotation of the pipe 12 while suppressing the damage of the pad mechanism 1.

The pipe 12 and the rod member 14 may be coupled by only one of the lower coupler 15a or the upper coupler 15b. The rod member 14 can be fixed more securely to the pipe 12 by coupling by both the lower coupler 15a and the upper coupler 15b. When a rotational force is applied to the pipe 12, a rotational force is transmitted from the rod member 14 to the second guide 22. At this time, the rod member 14 receives a reaction force corresponding to the rotational force from the second guide 22. If only one of the lower coupler 15a or the upper coupler 15b is provided, there is a possibility that a large force may act on the one of the lower coupler 15a or the upper coupler 15b, and damage, deformation, etc., of the rod member 14 or the coupler may occur. Therefore, it is favorable for the rod member 14 to be fixed to the pipe 12 by both the lower coupler 15a and the upper coupler 15b.

The suction gripping device 100 includes the multiple lock mechanisms 23. The sliding of the sliding parts 10 can be limited by the lock mechanisms 23 when transferring the workpiece, and the workpiece can be transferred stably. It is favorable for the lock mechanisms 23 to be controllable collectively by the lock controller 40. By collectively controlling the multiple lock mechanisms 23 to switch between the locked state and the unlocked state for the sliding parts 10, the configuration of the suction gripping device 100 can be simplified compared to the case where the lock mechanisms 23 are controlled individually. For example, the suction gripping device 100 can be more compact.

An example is described above in which the suction pad 11 is attached to the top surface of the workpiece. The attachment is not limited to the example, and the suction pad 11 may grip a side surface of a workpiece that has fallen over. In other words, the suction gripping device 100 can suction-grip a workpiece that has a first surface crossing the sliding direction of the sliding part 10. The suction pad 11 is attachable to the first surface crossing the sliding direction of the sliding part 10. The first surface may be any surface of the workpiece that faces the reverse direction of the sliding direction of the sliding part 10 (the direction in which the weight is applied).

Figure 13:
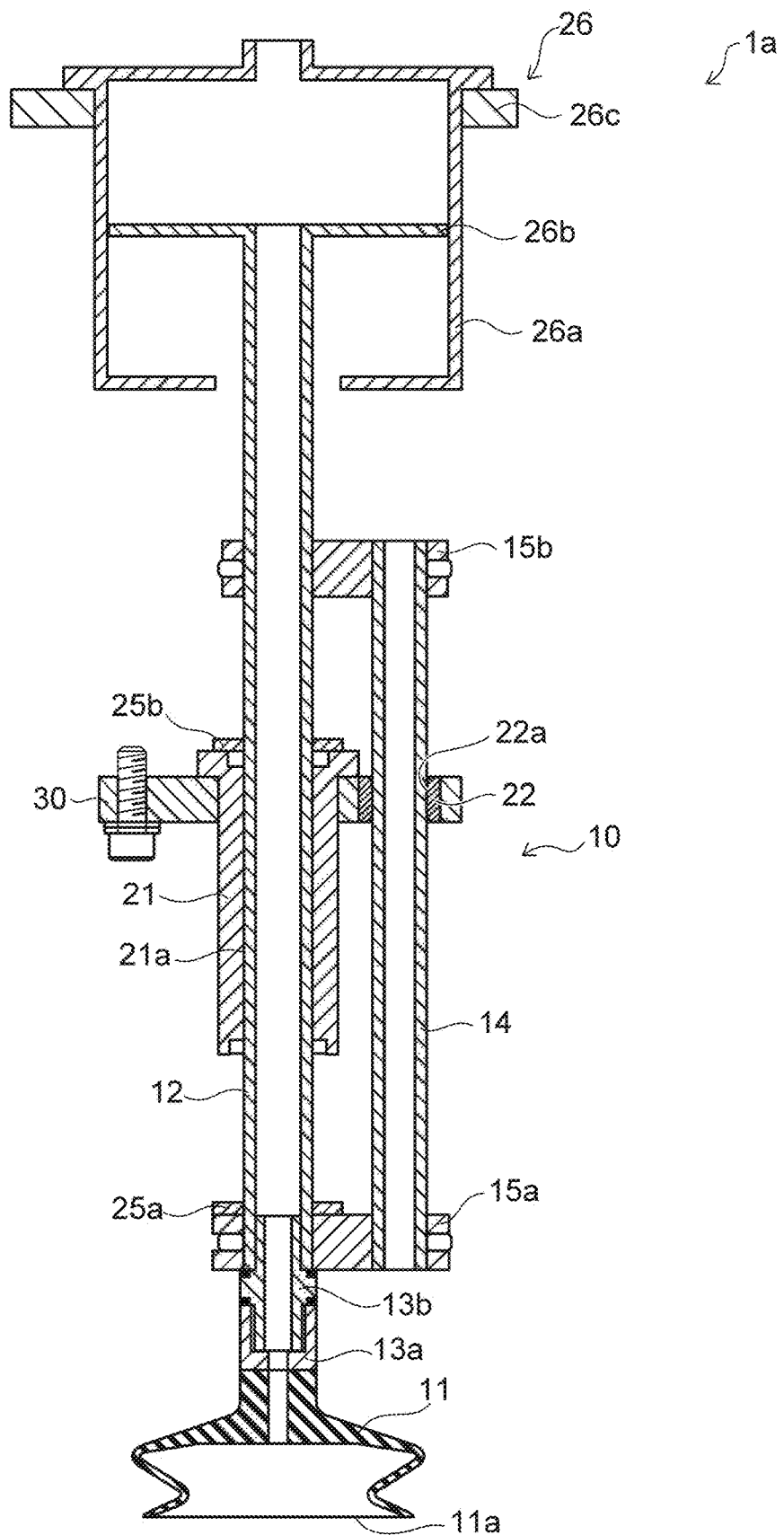
FIG. 13 is a cross-sectional view illustrating a pad mechanism according to a modification.

FIG. 13 is a cross-sectional view illustrating a pad mechanism according to a modification.

As illustrated in FIG. 13, a pad mechanism 1a according to the modification includes a lock mechanism 26 instead of the lock mechanism 23. The lock mechanism 26 includes a cylinder 26a, a piston 26b, and a fixed plate 26c.

The cylinder 26a is fixed to the fixed plate 26c. The fixed plate 26c is fixed with respect to the base 30. The piston 26b is provided inside the cylinder 26a. The piston 26b is provided at the upper part of the pipe 12. The pipe 12 and the piston 26b may be separate parts, or one part may be used as the pipe 12 and the piston 26b. The piston 26b slides in the Z-direction inside the cylinder 26a.

The piston 26b divides the space in the cylinder 26a into two. The internal space that is surrounded with the cylinder 26a and the piston 26b communicates with the pipe 12. The internal space of the cylinder 26a is connected to the pressure regulator 51 via the joint 17 and the tube 50 illustrated in FIG. 3 and FIG. 4. For example, when the sliding part 10 slides due to the weight, the pressure regulator 51 sets the pressure in the cylinder 26a to be changeable (the same as atmospheric pressure). When the sliding part 10 deforms along the top surface of the workpiece, the pressure regulator 51 depressurizes the interior of the suction pad 11 and the interior of the cylinder 26a and maintains the depressurization. The position of the piston 26b is fixed thereby. In other words, the sliding part 10 is in the locked state in which the sliding is limited.

When switching from the locked state to the unlocked state, the pressure regulator 51 increases the internal pressure of the suction pad 11 and the cylinder 26a. For example, the pressure regulator 51 vents the interior of the suction pad 11 and the interior of the cylinder 26a to the atmosphere. Thereby, the piston 26b can slide through the cylinder 26a.

To suppress the sliding of the sliding part 10 due to the weight of the workpiece when transferring the workpiece in the locked state, it is favorable for the surface area in the X-Y plane of the piston 26b to be greater than the surface area of the attachment surface 11a.

According to the pad mechanism 1a according to the modification, the lock mechanism can be realized using a simple configuration of a cylinder and a piston. Also, the locked state and the unlocked state of multiple lock mechanisms 26 can be switched collectively by the pressure control of the pressure regulator 51. Therefore, the lock control driver 41 for driving the lock controller 40 illustrated in FIG. 1 to FIG. 6 is unnecessary.

Figure 14:
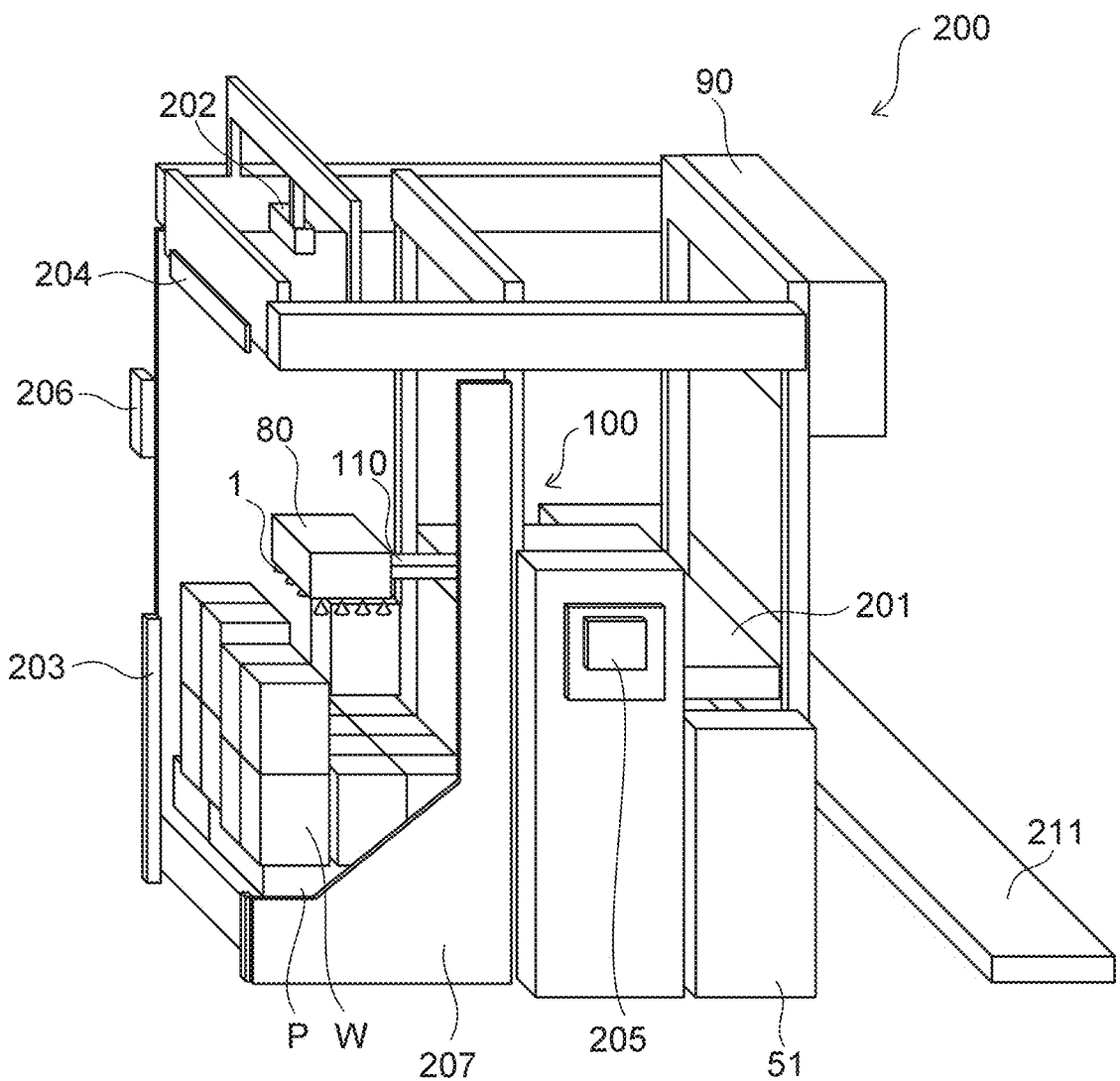
FIG. 14 is a schematic perspective view illustrating a transfer system according to the embodiment.

FIG. 14 is a schematic perspective view illustrating a transfer system according to the embodiment.

The transfer system 200 according to the embodiment includes the suction gripping device 100, the driver 110, a conveyor 201, a detector 202, a detector 203, a displayer 204, a main operation part 205, and a sub operation part 206.

For example, multiple workpieces W are placed on a pallet P next to the suction gripping device 100. The suction gripping device 100 grips the workpiece W placed on the pallet P. The driver 110 transfers the workpiece W one at a time onto the conveyor 201 by driving the base 30. The workpiece W that is placed on the conveyor 201 is transferred onto a conveyor 211 by another transfer apparatus.

The detector 202 is provided above the pallet P. The detector 202 detects the position and the size of each of the workpieces W. For example, the detector 202 includes at least one of a camera or a sensor. Based on the detection result of the detector 202, the controller 90 drives the multiple pad mechanisms 1 and causes the multiple pad mechanisms 1 to suction-grip the workpiece W to be transferred.

For example, a fence 207 is provided around the pallet P. The detector 203 is mounted to the fence 207. The detector 203 detects when a human goes inside the fence 207. The controller 90 stops or withdraws the suction gripping device 100 when the detector 203 detects the entrance of the human inside the fence 207. Infrared sensors, distance sensors, transmission-type photoelectric sensors, etc., can be used as the detectors 202 and 203.

The displayer 204 displays the operation status of the suction gripping device 100. For example, the displayer 204 displays information indicating that the suction gripping device 100 is operating or information indicating that the suction gripping device 100 is stopped. The main operation part 205 accepts detailed operations and settings of the suction gripping device 100. The sub operation part 206 accepts simple operations of the suction gripping device 100.

By providing the suction gripping device 100 in the transfer system 200, even when the top surface of the workpiece W is tilted, the workpiece W can be suction-gripped more stably while suppressing the interference of the base 30 and the excessive pressing of the workpiece by the suction pad 11.

Here, an example is described in which the transfer system 200 includes one suction gripping device 100. The transfer system 200 may include multiple suction gripping devices 100. Also, workpieces that are placed on the conveyor 201 may be loaded onto the pallet P by the suction gripping device 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A suction gripping device, comprising:
a pad mechanism mounted to a base, wherein
the pad mechanism includes:
a sliding part including a suction pad, a pipe, and a rod member fixed with respect to the pipe, the sliding part being slidable in a first direction with respect to the base, the suction pad attaching to a workpiece and being connected to the pipe at one end of the pipe,
a first guide guiding a sliding direction of the pipe to be in the first direction, the first guide being fixed with respect to the base,
a second guide guiding a sliding direction of the rod member to be in the first direction, and
a first coupler and a second coupler coupling the pipe and the rod member and being fixed with respect to the base,
an attachment surface of the suction pad contacts a first surface of a workpiece and is tiltable due to a weight of the sliding part when gripping the workpiece, the first surface crossing a sliding direction of the sliding part,
the first guide and the second guide are positioned between the first coupler and the second coupler in the first direction, and
the rod member is inserted through the second guide and the pipe is not inserted through the second guide.

2. The device according to claim 1, wherein a plurality of the pad mechanisms is provided in a second direction crossing the first direction.

3. The device according to claim 2, further comprising a plurality of lock mechanisms,
wherein the plurality of lock mechanisms are each switchable between an unlocked state in which a respective sliding part of the plurality of sliding parts is slidable and a locked state in which sliding of the respective sliding part of the plurality of sliding parts is limited.

4. The device according to claim 3, further comprising a lock controller mounted to the plurality of lock mechanisms,
wherein the locked states and the unlocked states of the plurality of lock mechanisms are switchable by driving by the lock controller.

5. The device according to claim 1, further comprising a pressure regulator connected to the pipe,
wherein the pressure regulator is configured to individually control an internal pressure of the suction pad.

6. The device according to claim 1, wherein a diameter of the pipe is different from a diameter of the rod member.

7. The device according to claim 6, wherein the rod member extends along the sliding direction.

8. The device according to claim 1, wherein, in a case where an inner space of the suction pad is depressurized, air flows inside the pipe.

9. The device according to claim 1, wherein the suction pad is connected rigidly to the one end of the pipe.

10. The device according to claim 1, wherein the attachment surface of the suction pad is tiltable 10 degrees or more due to the weight of the sliding part when the suction pad contacts the first surface.

11. The device according to claim 1, wherein a pressing force of 2.5 N or more is applied to the suction pad due to the weight of the sliding part when the suction pad contacts the workpiece.

12. The device according to claim 1, wherein the weight of the sliding part is not less than 1.0 times and not more than 1.2 times a weight capable of tilting the attachment surface 15 degrees when the suction pad contacts the workpiece.

13. A suction gripping device, comprising:
a pad mechanism mounted to a base, the pad mechanism including:
a sliding part slidable in a first direction with respect to the base, the sliding part including:
a suction pad attaching to a workpiece,
a pipe having the suction pad connected to one end of the pipe, and
a rod member fixed with respect to the pipe,
a first guide guiding a sliding direction of the pipe to be in the first direction, the first guide being fixed with respect to the base,
a second guide guiding a sliding direction of the rod member to be in the first direction, the second guide being fixed with respect to the base, and
a first coupler and a second coupler coupling the pipe and the rod member and being fixed with respect to the base, wherein
the first guide and the second guide are positioned between the first coupler and the second coupler in the first direction, and
the rod member is inserted through the second guide and the pipe is not inserted through the second guide.

14. A transfer system, comprising:
the suction gripping device according to claim 1; and
a driver driving the suction gripping device.

15. The system according to claim 14, further comprising a detector detecting a position or a size of the workpiece,
wherein the suction gripping device is driven based on a detection result of the detector.

16. A transfer method, comprising:
using a suction gripping device to grip a first surface of a workpiece with a suction pad, wherein
the suction gripping device includes:
a pad mechanism mounted to a base, the pad mechanism including:
a sliding part including the suction pad, a pipe and a rod member fixed with respect to the pipe, the sliding part being slidable in a first direction with respect to the base, the suction pad attaching to the workpiece and being connected to one end of the pipe, the first surface crossing a sliding direction of the sliding part,
a first guide guiding a sliding direction of the pipe to be in the first direction, the first guide being fixed with respect to the base,
a second guide guiding a sliding direction of the rod member to be in the first direction, and
a first coupler and a second coupler coupling the pipe and the rod member and being fixed with respect to the base, and
a base driver driving the base,
the first guide and the second guide are positioned between the first coupler and the second coupler in the first direction,
the rod member is inserted through the second guide and the pipe is not inserted through the second guide, and
when the suction pad grips the workpiece, the gripping is performed after an attachment surface of the suction pad contacting the first surface is deformed along the first surface due to a weight of the sliding part.

17. The method according to claim 16, wherein
the suction gripping device further includes a lock mechanism switchable between an unlocked state in which the sliding part is slidable, and a locked state in which sliding of the sliding part is limited,
the suction pad grips the workpiece in the unlocked state, and
the workpiece is transferred by switching to the locked state after the workpiece is gripped by the suction pad.

18. The method according to claim 17, wherein the gripping by the suction pad is released and the locked state is switched to the unlocked state after the workpiece is transferred to a prescribed position.

19. The method according to claim 16, wherein a diameter of the pipe is different from a diameter of the rod member.

20. The method according to claim 16, wherein, in a case where an inner space of the suction pad is depressurized, air flows inside the pipe.

* * * * *